(12) United States Patent
Chelaidite et al.

(10) Patent No.: US 11,821,479 B2
(45) Date of Patent: Nov. 21, 2023

(54) ELECTRIC BRAKE FOR VEHICLE

(71) Applicants: ZF Active Safety US Inc., Livonia, MI (US); ZF Active Safety GmbH, Koblenz (DE)

(72) Inventors: Galus Chelaidite, South Lyon, MI (US); Kraig Gerber, Plymouth, MI (US); Bogdan Draghici, Herschbach (DE)

(73) Assignees: ZF Active Safety US Inc., Livonia, MI (US); ZF Active Safety GmbH, Koblenz (DE)

( * ) Notice: Subject to any disclaimer, the term of this patent is extended or adjusted under 35 U.S.C. 154(b) by 0 days.

(21) Appl. No.: 17/572,676

(22) Filed: Jan. 11, 2022

(65) Prior Publication Data
US 2023/0220895 A1 Jul. 13, 2023

(51) Int. Cl.
| F16D 65/18 | (2006.01) |
| F16D 121/24 | (2012.01) |
| F16D 125/50 | (2012.01) |
| F16D 125/48 | (2012.01) |
| F16D 125/34 | (2012.01) |

(52) U.S. Cl.
CPC .......... *F16D 65/18* (2013.01); *F16D 2121/24* (2013.01); *F16D 2125/34* (2013.01); *F16D 2125/48* (2013.01); *F16D 2125/50* (2013.01)

(58) Field of Classification Search
CPC .. F16D 65/18; F16D 2121/24; F16D 2125/34; F16D 2125/48; F16D 2125/50; F16H 3/72; F16H 3/724–725; F16H 1/28; F16H 2025/2087; F16H 2025/209
See application file for complete search history.

(56) References Cited

U.S. PATENT DOCUMENTS

| 6,138,801 A * | 10/2000 | Shirai | F16D 65/22 188/162 |
| 9,447,830 B2 | 9/2016 | Bull | |
| 2014/0034432 A1* | 2/2014 | Bull | B60T 13/741 188/106 R |
| 2015/0129371 A1* | 5/2015 | Gutelius | B60T 13/741 188/72.1 |
| 2016/0339890 A1* | 11/2016 | Cann | B60T 13/745 |
| 2018/0093653 A1* | 4/2018 | Bull | B60T 1/10 |
| 2020/0049215 A1* | 2/2020 | Song | B60T 8/17 |
| 2021/0016758 A1* | 1/2021 | Choi | B60T 1/10 |

* cited by examiner

*Primary Examiner* — Lori Wu
(74) *Attorney, Agent, or Firm* — Robert James Harwood

(57) ABSTRACT

A system for controlling an electric brake for a wheel rotor having a brake pad associated therewith includes a housing defining a passage. An assembly is provided in the passage and includes a spindle rotatable about an axis and a piston aligned with the brake pad and axially movable in response to rotation of the spindle. A planetary gear stage includes a sun gear, a ring gear, and planetary gears. A first motor is coupled to the sun gear. A second motor coupled to the ring gear. A control system is configured to, in response to a detected braking event, rotate the first motor in a first direction to supply torque to the sun gear while the second motor is rotated in a second direction at varying speeds to supply torque to the ring gear such that the piston is cyclically moved towards and away from the brake pad to modulate a braking force on the rotor.

20 Claims, 10 Drawing Sheets

ELECTRIC BRAKE FOR VEHICLE

TECHNICAL FIELD

The present invention relates to braking systems and, in particular, relates to an electric brake having multiple motors for controlling a rotatable spindle.

BACKGROUND

Current vehicles are equipped with electric motor service brakes for helping control vehicle braking depending on predetermined scenarios. The service brakes rely on one or more movable pistons that selectively apply force to brake pads in order to slow down or stop rotating wheel rotors on the vehicle. The electric motor direction of rotation can be reversed to release or reduce braking in emergency scenarios or drive-away conditions from a standstill on a hill.

SUMMARY

In one example, a system for controlling an electric brake for a wheel rotor having a brake pad associated therewith includes a housing defining a passage. An assembly is provided in the passage and includes a spindle rotatable about an axis and a piston aligned with the brake pad and axially movable in response to rotation of the spindle. A planetary gear stage includes a sun gear, a ring gear encircling the sun gear. A first motor is coupled to the sun gear. A second motor coupled to the ring gear. A control system is configured to, in response to a detected braking event, rotate the first motor to supply torque to the sun gear, and rotate the second motor to supply torque to the ring gear such that the piston is moved towards or away from the brake pad to modulate a braking force on the rotor.

In another example, a method for controlling an electric brake for a wheel rotor having a brake pad associated therewith includes providing a housing defining a passage. An assembly is provided in the passage and includes a spindle rotatable about an axis and a piston aligned with the brake pad and axially movable in response to rotation of the spindle. First and second motors are provided. A planetary gear stage is provided and includes a sun gear coupled to the first motor, a ring gear coupled to the second motor and encircling the sun gear, and planetary gears in meshed engagement with the sun gear and the ring gear. The first motor is rotated in a first direction to supply torque to the sun gear while rotating the second motor in a second direction. The rotation speed of at least one of the first and second motor is varied such that the piston is cyclically moved towards and away from the brake pad to selectively apply a braking force to the rotor.

In another example, a system for controlling an electric brake for a wheel rotor having a brake pad associated therewith includes a housing defining a passage. An assembly is provided in the passage and includes a spindle rotatable about an axis and a piston aligned with the brake pad and axially movable in response to rotation of the spindle. A planetary gear stage includes a sun gear, a ring gear encircling the sun gear. A first motor is coupled to the sun gear. A second motor coupled to the ring gear. A control system is configured to, in response to a detected braking event, rotate the first motor to supply torque to the sun gear while the second motor is rotated to supply torque to the ring gear to vary a rotation speed of the spindle without increasing the torque thereon.

Other objects and advantages and a fuller understanding of the invention will be had from the following detailed description and the accompanying drawings.

DETAILED DESCRIPTION

Figure 1:
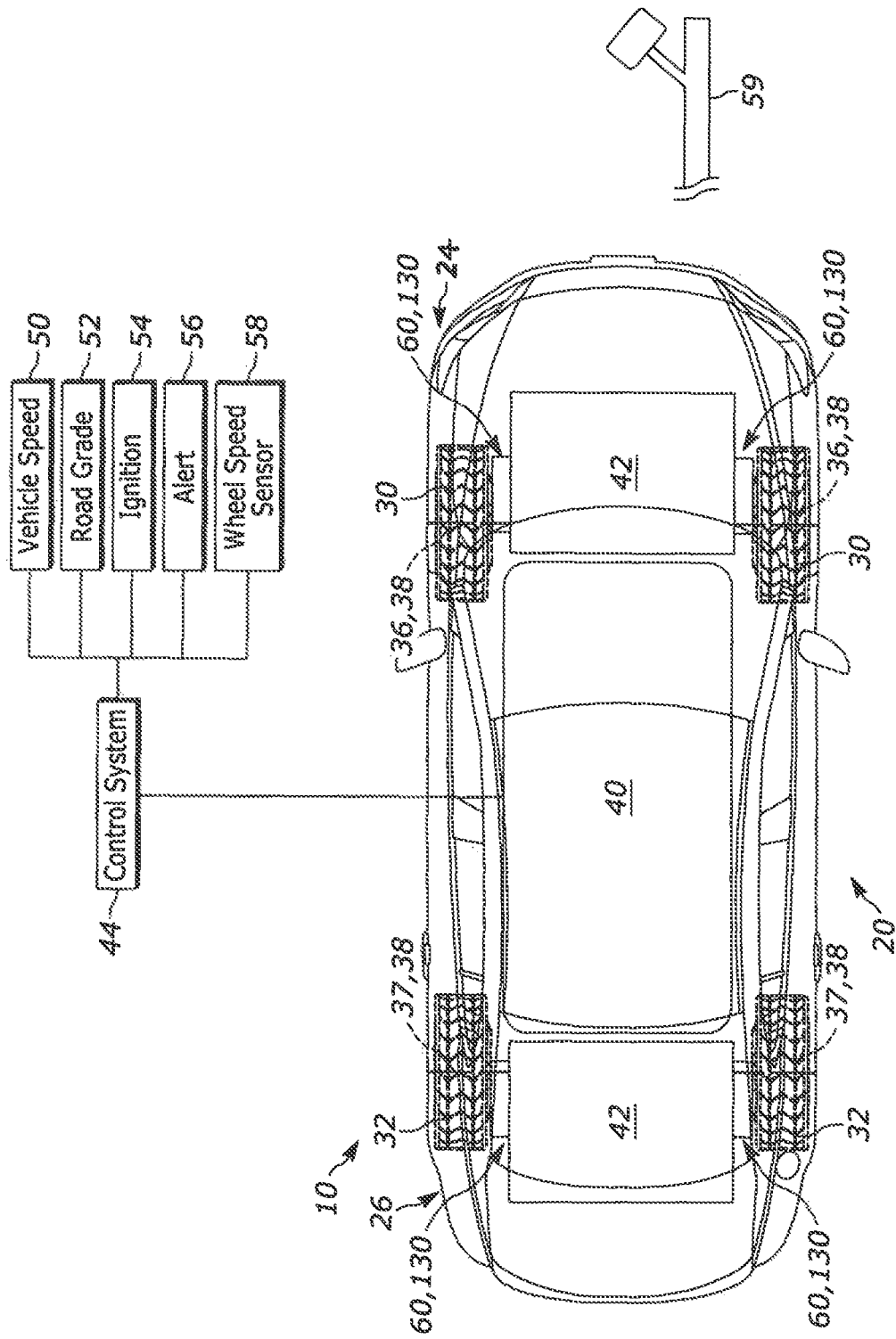
FIG. 1 is a schematic illustration of a vehicle having a braking system.

The present invention relates to braking systems and, in particular, relates to an electric brake having multiple motors for controlling a rotatable spindle. FIG. 1 illustrates an example electric brake/braking system 10 for a motor vehicle 20 in accordance with the present invention. The vehicle 20 can be an electric or hybrid vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of steerable or non-steerable wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

In the case of an electric vehicle, a battery 40 supplies power to the vehicle 20 and cooperates with front and/or rear powertrains 42 to supply torque to the wheels 30. In other words, the battery 40 forms part of the vehicle propulsion system.

A caliper or caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. The caliper assembly 60 is an electromechanical brake and therefore does not rely on or require hydraulic fluid to operate.

A control system 44 is provided to help control operation of the vehicle 20, such as operation of the propulsion system and vehicle braking, including operation of the caliper assemblies 60. To this end, the control system 44 can include one or more controllers, such as a propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of ignition status. A wheel speed sensor 58 is provided on/adjacent to each wheel 32 and generates signals indicative of the speed at each wheel. The control system 44 also receives signals indicative of the degree—including velocity and acceleration—a brake pedal 59 is depressed.

The control system 44 can receive and interpret these signals and perform vehicle functions, e.g., braking, in response thereto. In one example, the control system 44 can detect wheel slip between one or more wheels 30, 32 and the driving surface based on the sensors 50, 58 and perform anti-lock braking (ABS) and/or electronic stability control (ESC) using one or more caliper assemblies 60. The control system 44 can also be connected to an alert 56 for notifying the driver/operator of the vehicle 20 of vehicle conditions, vehicle status, braking operations, and/or environmental conditions.

Figure 2A:
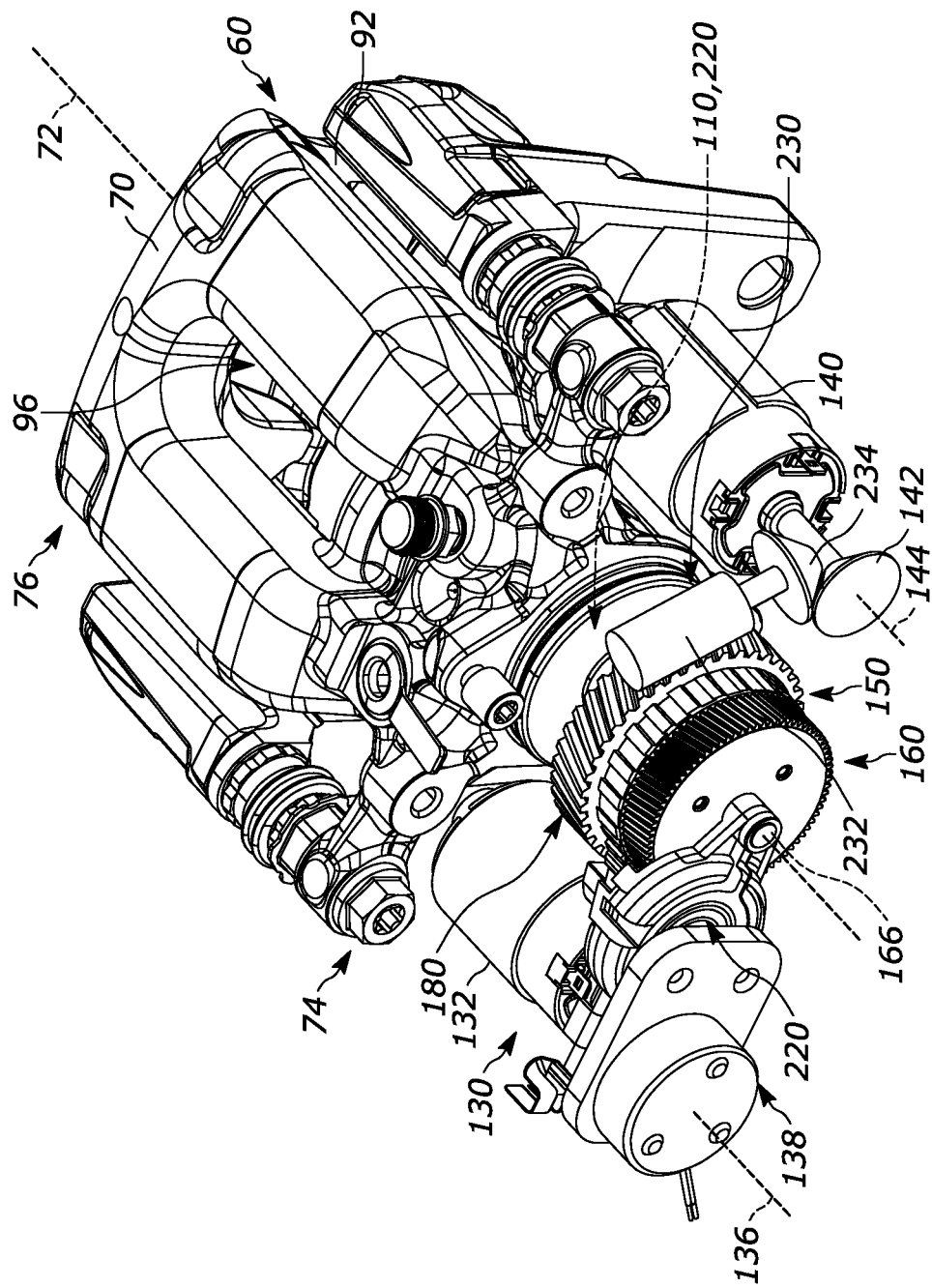
FIG. 2A is a perspective view of an example caliper and drive assembly for the braking system of FIG. 1.
Figure 2B:
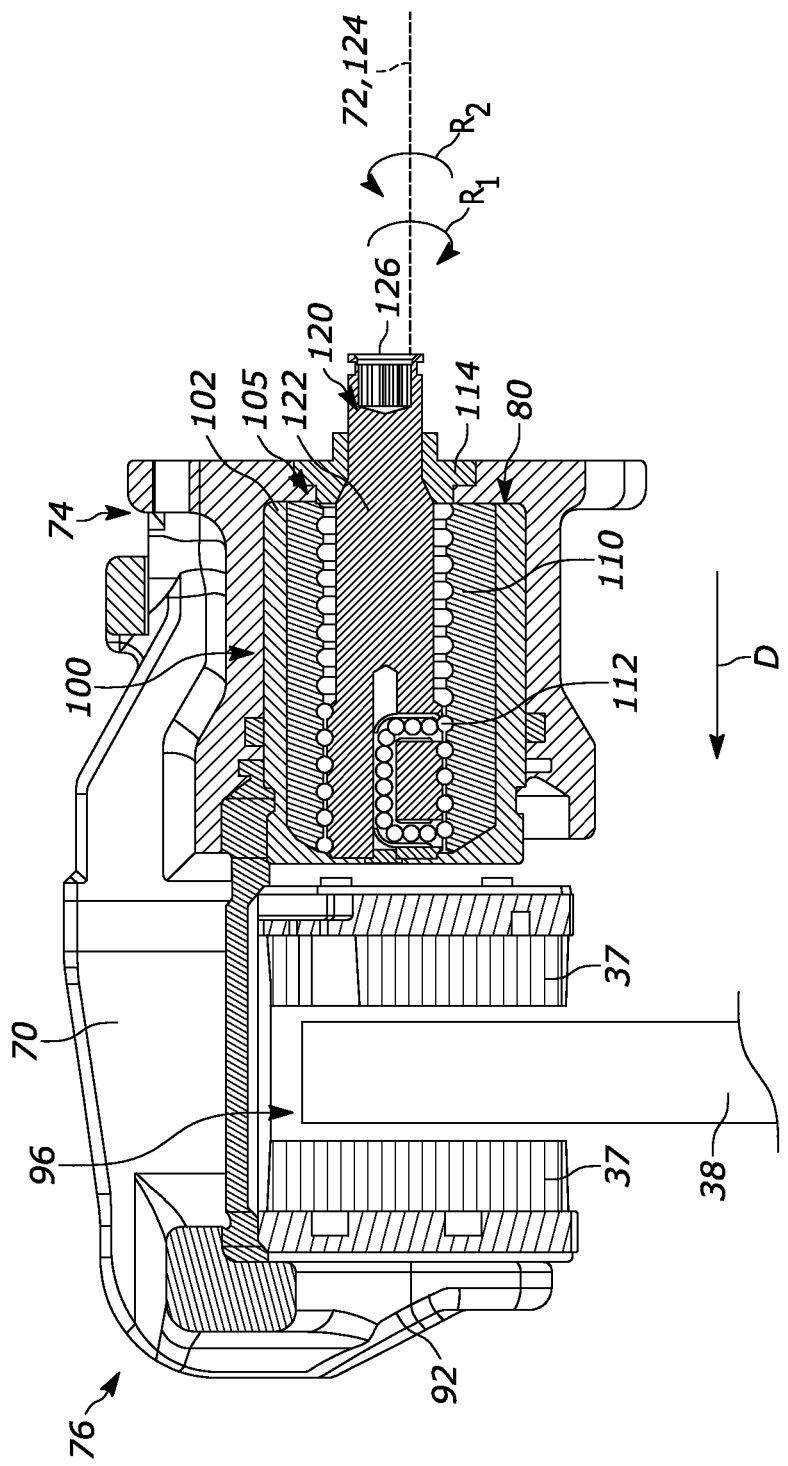
FIG. 2B is a section view of an example piston assembly for the caliper.

Referring to FIGS. 2A-2B, the caliper assembly 60 includes a housing 70 and a drive assembly or actuator 130 connected to the housing 70. The housing 70 extends generally along a centerline 72 from a first end 74 to a second end 76. A bore or passage 80 extends into the housing 70 and along the centerline 72.

Fingers 92 extends from the second end 76 of the housing 70. The fingers 92 defines a channel 96 for receiving the rotor 36 or 38 (the rotor 38 is shown as an example) of one of the wheels 30 or 32. The brake pads 37 are directly or indirectly connected to the housing 70 within the channel 96 and positioned on opposite sides of the rotor 38.

A piston assembly 100 is provided in the passage 80. As shown, the piston assembly 100 includes a piston 102 and a spindle assembly 120 that cooperate to apply braking force to the brake pads 37 in a mechanically high-efficiency manner. More specifically, the piston assembly 100 can be configured in any manner such that rotational movement of the spindle assembly 120 results in axial movement of the piston 102 relative to the brake pad 37. To this end, the piston assembly 100 can be configured as a ball nut assembly (recirculating or non-recirculating), a roller screw, a ball ramp assembly or any high efficiency mechanical assembly capable of converting rotary motion to linear motion. Examples of ball nut and ball ramp assemblies can be found in U.S. Pat. No. 9,976,614 and U.S. Patent Publication No. 2019/0331180, the entirety of which are incorporated herein by reference.

For illustrative purposes, and referring to FIG. 2B, the piston assembly 100 is configured as a ball nut assembly. With this in mind, the piston 102 is provided in the passage 80 in the housing 70 in a manner that prevents relative rotational movement therebetween but allows for relative axial movement. In one example, the piston 102 is keyed to the housing 70 with one or more keys, lobes, splines or flats (not shown). Alternatively/additionally, a high interference rubber seal (not shown) can be provided between the piston 102 and housing 70 or the piston may be interconnected with the adjacent brake pad via protrusions on the brake pad backing plate and matching depressions on the piston face (not shown).

The spindle assembly 120 includes a spindle 122 extending along an axis 124. A splined portion 126 is provided on an end of the spindle 122 that extends out of the housing 70. A ball nut assembly 105 connects the piston 102 to the spindle 122. The ball nut assembly 105 includes a ball nut 10 and ball bearing members 112. The spindle 122 in this configuration acts as a ball screw. To this end, the bearing members 112 are provided in cooperating helical grooves on the exterior of the spindle 122 and interior of the ball nut 110. A spacer 114 helps to connect the spindle 122 to the housing 70.

The ball nut 110 is fixed relative to the piston 102 to prevent relative rotation. The spindle 122 is axially fixed. Due to this configuration, rotation of the spindle 122 about the axis 124 in, for example, the direction $R_1$, causes the ball nut 110 to move axially in the direction D. This causes the piston 102 to advance in the direction D and ultimately into engagement with the brake pad 37. On the other hand, rotation of the spindle 122 about the axis 124 in a direction $R_2$ opposite the direction $R_1$ causes the piston 102 to retract from the brake pad 37.

As noted, the piston 102 is prevented from rotating relative to the housing 70, with the resistance to relative rotation being increased due to contact friction between the piston and the back of the brake pad 37. That said, torque may be increased and decreased at the spindle 122 to increase and respectively decrease clamp force on the rotor 38.

Figure 3A:
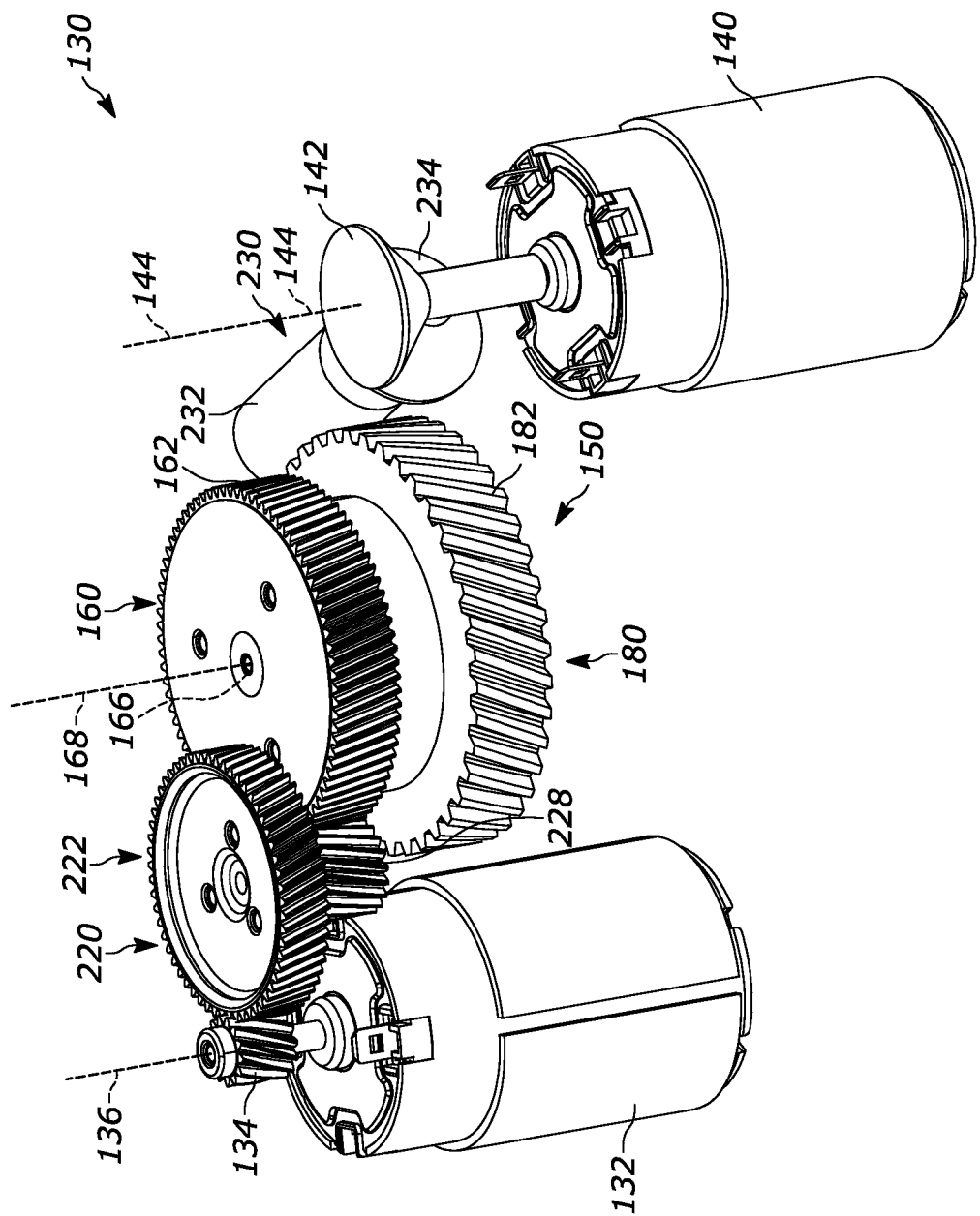
FIG. 3A is a top view of the drive assembly for the braking system.
Figure 3B:
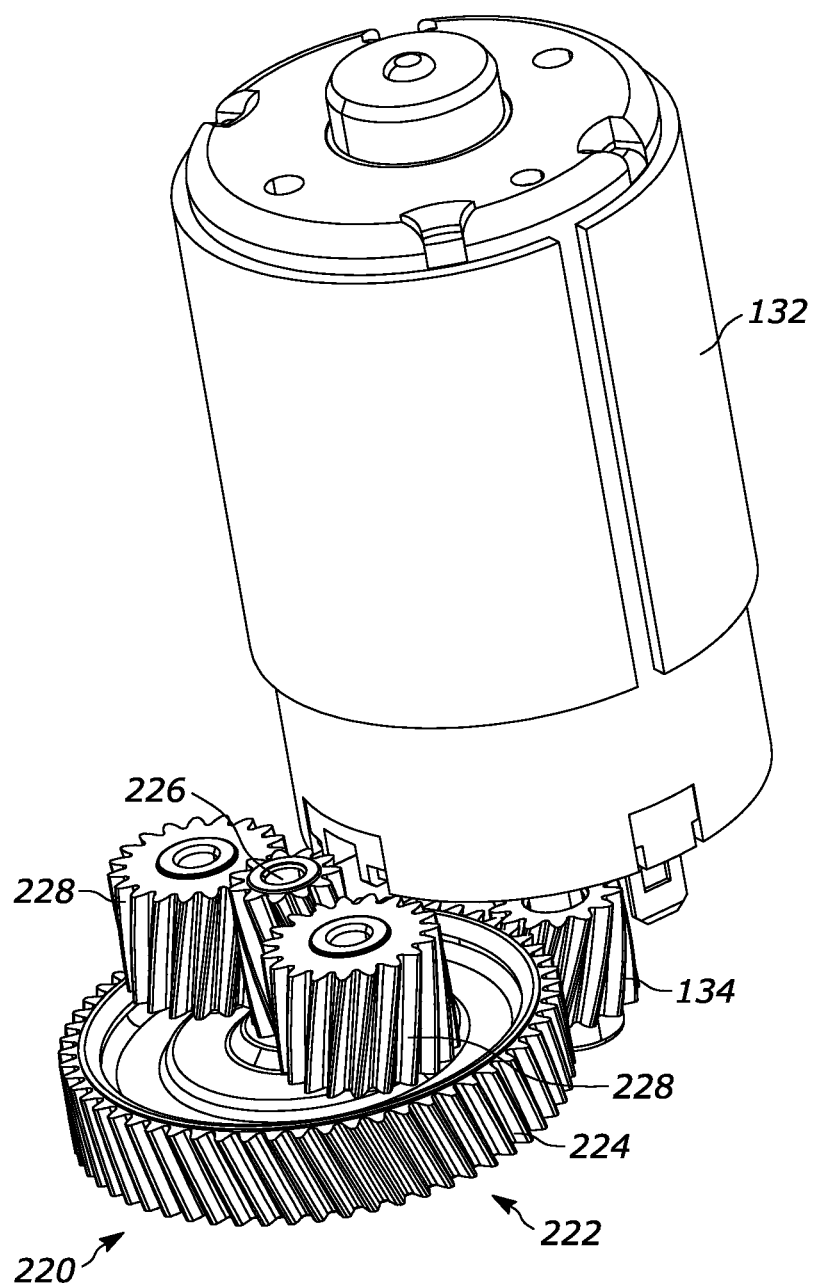
FIG. 3B is a top view of a coupling device for the drive assembly of FIG. 3A.

Turning to FIGS. 3A-3B, a drive assembly 130 is provided for selectively applying torque to the spindle 122 for rotation in either direction $R_1$ or $R_2$. The drive assembly 130 includes a first motor 132 having a gear 134 rotatable about an axis 136. A second motor 140 includes a gear 142 rotatable about an axis 144.

In applications where the desired braking force F is relatively lower or where braking temperatures are easily kept below a certain threshold, e.g., smaller vehicles or vehicle equipped with regenerative brakes, both motors 132, 140 may be brushed DC motors. In applications where the braking force F is relatively higher or frequent high braking temperature is expected, e.g., heavy duty trucks or sports cars, the first motor 132 can be a brushless DC motor and the second motor 140 can be a brushed DC motor. In either case, both motors 132, 140 could be brushless DC motors. That said, mechanism 138 (see FIG. 2A), such as an electromagnetic/solenoid brake, is coupled to the gear 134 and energized and de-energized for selectively allowing and preventing rotation of the gear, as will be described.

A gear train couples each motor 132, 140 to the spindle 122. One or more housings (not shown) can enclose and cooperate with the gear train. It will be appreciated that the gear train can include more or fewer gear stages than those shown and described. In the example shown, a planetary gear stage 150 helps connect the gears 134, 142 of the respective motors 132, 140 to the spindle 122. More specifically, the planetary gear stage 150 enables each motor 132, 140 to supply torque to the spindle 122 to thereby rotate the spindle about its axis 124 in either direction $R_1$ or $R_2$.

Figure 4A:
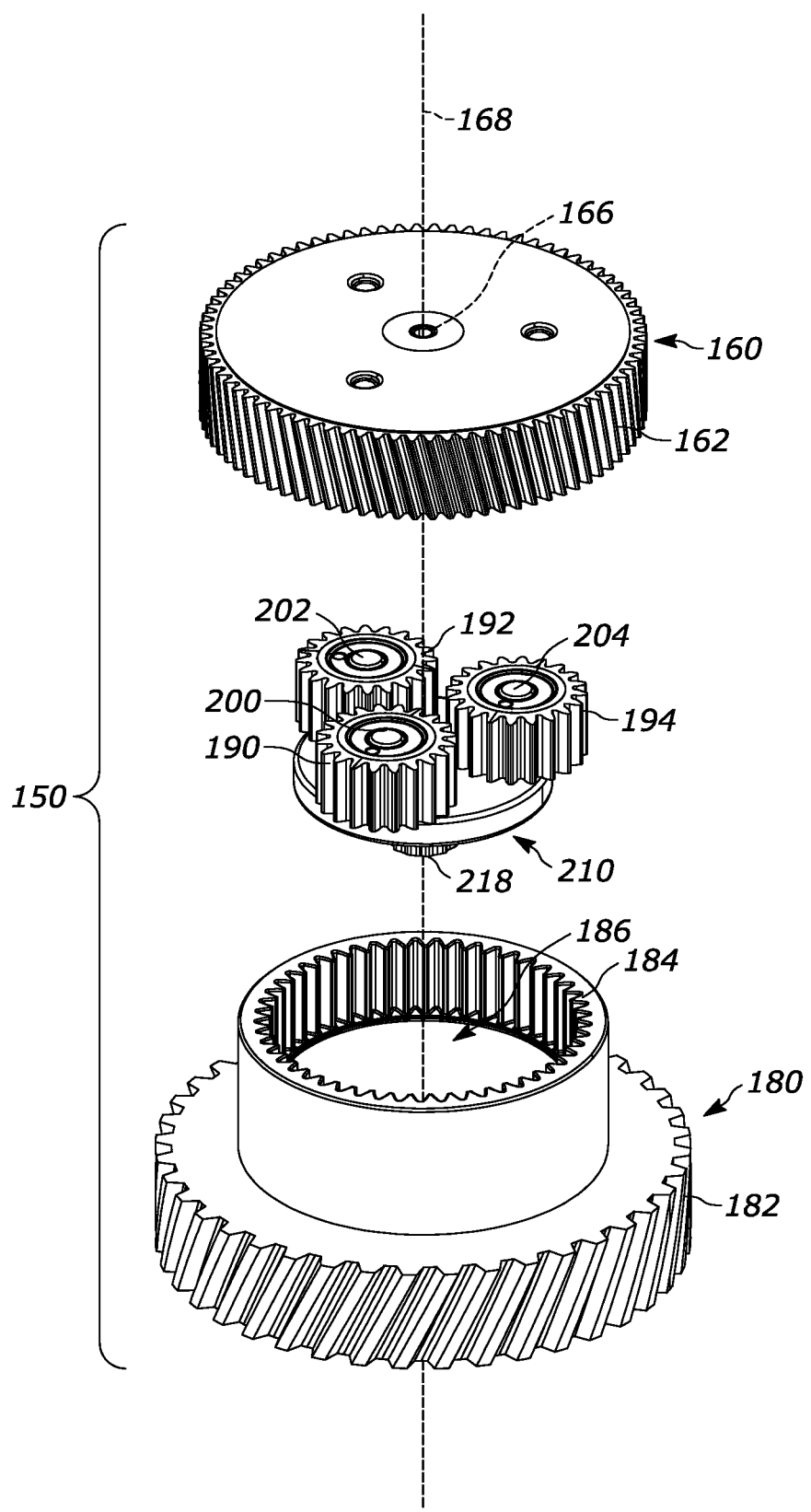
FIG. 4A is an exploded view of a planetary gear stage of the drive assembly.
Figure 4B:
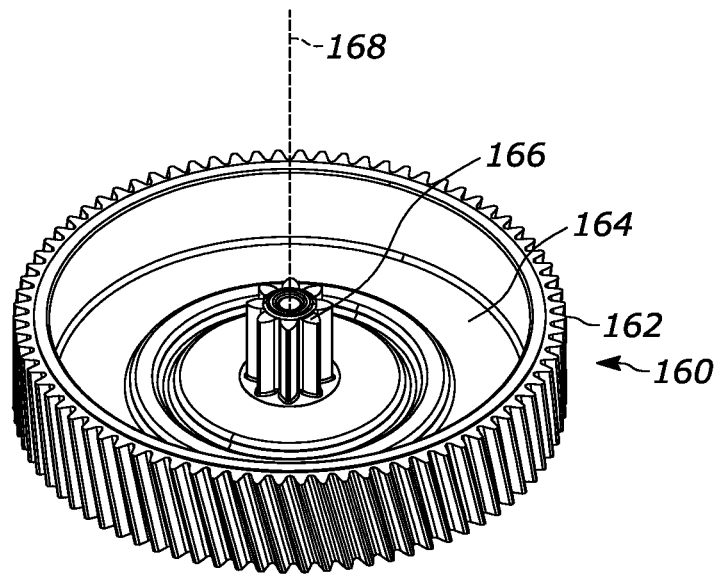
FIG. 4B is a bottom view of a two stage gear of the drive assembly.
Figure 4C:
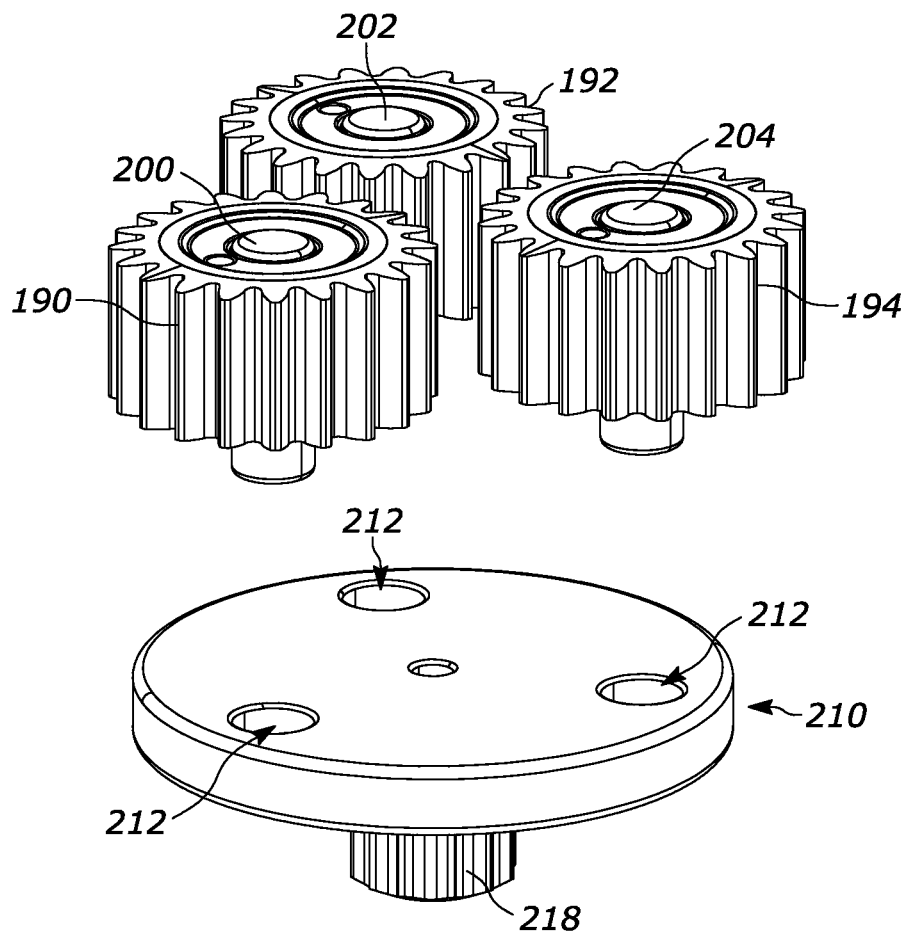
FIG. 4C is a schematic illustration of planetary gears of the drive assembly.

The planetary gear stage 150 includes a two stage gear 160 and a ring gear 180. Referring further to FIGS. 4A and 4B, the two stage gear 160 includes exterior teeth 162 and an axial end surface 164. A sun gear 166 extends from and is integrally formed with the end surface 164. The sun gear 166 rotates about an axis 168 extending through the two stage gear 160.

The ring gear 180 includes a worm gear having exterior teeth 182 and a passage 186 extending entirely through the ring gear. Interior teeth 184 are provided along the passage 186. As shown in FIG. 4A, the ring gear 180 is centered with the two stage gear 160 about the axis 168 such that the sun gear 166 extends into the passage 186. Planetary gears 190, 192, 194 are arranged about the sun gear 166, and are in meshed engagement with both the sun gear and the interior teeth 184 of the ring gear 180. The planetary gears 190, 192, 194 are supported for rotation by respective axles 200, 202, 204, which can be press-fit into holes or openings 212 in a carrier 210 (see Fig. also 4C). A splined projection 218 extends from the carrier 210 away from the planetary gears 190, 192, 194 and is fixed for rotation (not shown) with the splined portion 126 of the spindle 122.

The gear train further includes a device 220 (see FIGS. 3A-3B) that couples the gear 134 of the first motor 132 to the two stage gear 160. In one example, the device 220 includes a two stage gear 222 having exterior teeth 224 and an idler gear 226. The exterior teeth 224 mesh with the gear 134 on the first motor 132. Gears 228 mesh with the idler gear 226 and the exterior teeth 162 of the two stage gear 160. In this manner, the gears 228 act as driven gears by the idler gear 226 for delivering torque to the two stage gear 160. That said, a torque flow path exists from the first motor 132, through the gear 134, through the two stage gear 222, through the driven gears 228, and to the exterior teeth 162 of the two stage gear 160. Consequently, the first motor 132 is responsible for/capable of delivering torque to the two stage gear 160.

The gear train further includes a device 230 (FIGS. 2A and 3A) that couples the gear 142 of the second motor 140 to the ring gear 180. In one example, the device 230 includes a worm 232 and a bevel gear 234 integrally formed, and rotatable with, one another. The worm 232 forms a self-locking connection with the exterior teeth 182 of the ring gear 180. That said, a torque flow path exists from the second motor 140, through the gear 142, through the bevel gear 234 and worm 232, and to the ring gear 180. Consequently, the second motor 140 is responsible for/capable of delivering torque to the ring gear 180.

It will be appreciated that devices 220, 230 different than that shown can be used to transfer torque from the motors 132, 140 to the respective gears 160, 180. This can include, for example, more or less gears in either device 220 or 230 and/or different gears than those illustrated and described.

Figure 5:
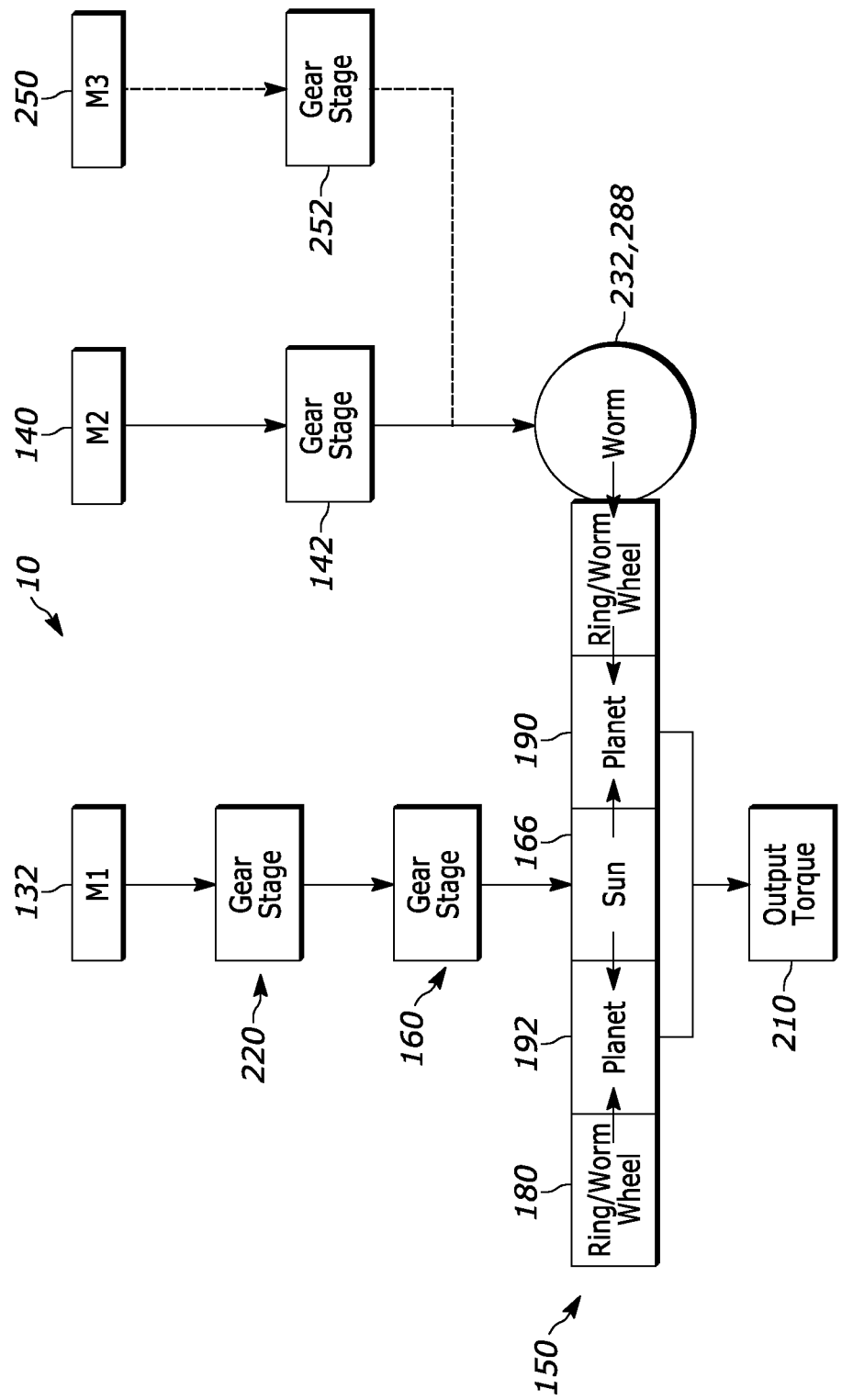
FIG. 5 is a schematic illustration of a braking operation with the coupling mechanism in a first condition.

Turning to FIG. 5, during operation of the electric brake 10, a service brake apply demand is initiated by the system and/or vehicle operator. In this example, service braking is provided for a single, rear end 26 wheel rotor 38. The brake demand is based on signals received by the control system 44 indicative of the brake pedal 59 depression. If the service brake demand is below a predetermined amount, the control system 44 activates only the first motor 132 to rotate in a brake apply direction to supply a first torque Ti to the sun gear 166 along the aforementioned flow path. The second motor 140 is not activated and, thus, the ring gear 180 is stationary.

That said, applying torque to the sun gear 166 causes the planetary gears 190, 192, 194 to rotate about their respective axles 200, 202, 204 while collectively revolving the planetary gears about the sun gear and within the stationary ring gear 180. The rotating planetary gears 190, 192, 194 orbit the rotating sun gear 166, causing rotation of the carrier 210. Since the splined projection 218 on the carrier 210 and the splined portion 126 of the spindle 122 are fixed together, rotating the carrier rotates the spindle 122 in the $R_1$ or brake apply direction. This, in turn, causes the piston 102 to move in the direction D and apply a braking force to the brake pad 37, thereby braking the rotor 38.

If the service brake demand is at or exceeds the predetermined amount, the control system 44 activates both the first and second motors 132, 140 to rotate in a brake apply direction. In particular, the second motor 140 is activated when it is desirable to more quickly apply the braking force F. That said, the first motor 132 is rotated about the axis 136 to supply torque to the sun gear 166 along the aforementioned flow path. At the same time, the second motor 140 is rotated about the axis 144 in the same direction as the first motor 132, which supplies torque to the ring gear 180 along the aforementioned flow path. The brake apply directions for the first and second motors 132, 140 are the same, i.e., both clockwise or both counterclockwise.

The sun gear 166, ring gear 180, and planetary gears 190, 192, 194 combine the inputs from the first and second motors 132, 140 such that the carrier 210 is rotated at a greater speed compared to when only the first motor is rotated in the brake apply direction. This, in turn, rotates the spindle 122 at a greater speed in the brake apply direction $R_1$ and causes the piston 102 to move in the direction D more rapidly. In other words, rotating both motors 132, 140 in the brake apply direction causes the piston 102 to more rapidly advance to the brake pad 37 and, thus, the brake force F is applied to the brake pad more rapidly compared to the speed at which the braking force is supplied by operation of only the first motor 132.

It will be appreciated that based on the rotation speeds of the motors 132, 140 and/or the gearing in the gear train, activating both motors can produce the same torque at the carrier 210 as is supplied when only the first motor is activated. In other words, introducing the second motor 140 rotation varies only the speed—not the torque—of the spindle 122.

Rotation of the motors 132, 140 continues until a predetermined current draw on one of the motors exceeds a preset value. In one example, both motors 132, 140 are rotated until the current draw on the second motor 140 exceeds, for example, about 15 A, at which point the second motor is deactivated while the first motor 132 continues rotating to increase the braking force F.

In either service braking scenario described above, it may be desirable to apply the parking brake once the service brake is applied. Once the desired braking force F is applied to the rotor 38, the first motor 132 can be deactivated and the mechanism 138 locked to prevent rotation of the gear 134 and thereby prevent back drive thereof. At the same time, the second motor 140 is deactivated and the worm gear 232 automatically self-locks with the ring gear 180 to prevent rotation of the gear 142 and thereby prevent back drive thereof. Consequently, both motors 132, 140 are prevented from rotating and, thus, the piston 102 is firmly held in place applying the parking brake to the rotor 38.

The mechanism 138 can be unlocked to allow rotation of the gear 134 and the motor 132 then rotated in the brake apply direction to fully release the parking brake. With this in mind, unlocking the mechanism 138 will allow the piston assembly 100 to automatically back drive. Consequently, the first motor 132 can be activated to help ensure any residual clamp force F is released and allows the piston 102 to retract away from the brake pad 37.

A situation may arise in which it is desirable to reduce the braking force F on the brake pad(s) 37 temporarily, e.g., an emergency situation/event (such as ABS braking and/or ESC braking). This particular braking operation activation can be in response to, for example, signals received from one or more of the sensors 50, 52, 58 indicating the emergency event, i.e., imminent wheel slip is predicted by the braking system. In such situations, it is advantageous to quickly and temporarily release/reduce the braking force F in a manner that helps to prevent wheel lock while allowing the braking force to be quickly and easily re-applied.

With this in mind, it is desirable to release/reduce the braking force F from the brake pad 37 quickly from the current braking force level F to which the service brake has been applied. To this end, the control system 44 of the present invention is advantageously configured to continue rotating the first motor 132 in the service brake apply direction but rotates the second motor 140 in the opposite direction. More specifically, as the first motor 132 continues rotating in the same direction, e.g., clockwise, the second motor is rotated in the opposite, e.g., counterclockwise direction.

Moreover, the control system 44 varies the speed of the first motor 132 and second motor 140 such that the rotation direction of the carrier 210 fluctuates between clockwise and counterclockwise to apply or release clamp force. The carrier 210 rotation speed and direction depends on the relative rotation speed of the sun 166 and the ring 184 as described in the following few paragraphs.

When the second motor 140 is operated at the relatively lower speed, the first motor 132 dominates the rotation speed and direction of the carrier 210 and, thus, the spindle 122 will continue rotating in the direction $R_1$—causing the piston 102 to advance. When the second motor 140 is operated at the relatively higher speed, while the first motor 132 is operated at a reduced speed, the second motor dominates the rotation speed and direction of the carrier 210 and, thus, the spindle 122 will rotate in the opposite direction $R_2$—causing the piston 102 to retreat. It is therefore clear that the difference in rotation speed between the first motor 132 and the second motor 140 controls the rotation speed and direction of the carrier 210.

Stated differently, the spindle 122 rotates in the direction $R_1$ when the motors 132, 140 are rotated under certain (or first) relative speed configurations and rotates in the direction $R_2$ when the motors are rotated under different (or second) relative speed configurations. That said, it will be appreciated that the rotation speed of the first motor 132 can alternatively or additionally be adjusted while rotating in the brake apply direction to vary the relative rotation speeds between the independently controlled motors 132, 140 in a manner that causes the piston 102 to advance/retract.

This allows the elastically deformed bridge 92, housing 70, and pad 37 to automatically relax helping to drive the piston 102 towards the passage 80 in the direction opposite the direction D. The spindle 122 rotates in the direction $R_2$ opposite the direction $R_1$ to retract the piston 102. The piston 102 retraction reduces the applied braking force F compared to the brake apply operation. The brake force F can be reduced a predetermined amount, including up to removing the braking force entirely.

By rapidly varying the rotation speed of the first motor 132 and of the second motor 140, the control system 44 can advantageously control/modulate the braking force F in a rapid manner during emergency events. Moreover, since this occurs without changing the rotation direction of the first motor 132 or of the second motor 140, this manner of braking control occurs with reduced power consumption and in a more timely manner compared to braking systems in which a single motor must reverse rotation to accomplish the alternating brake release/re-apply function.

That said, it will be appreciated that the gear ratios in the gear train, including in the planetary gear stage 150, the device 220, and/or the device 230 are selected to enable the control system 44 to operate the service brake and emergency braking in the manner described. For example, the gear ratios can be tailored to dictate the range of rotation speeds for the first motor 132 as well as for the second motor 140.

Once the emergency event is over, the control system 44 can rotate one or both motors 132, 140 in the same brake apply direction to re-advance the piston in the direction D in order to reapply the braking force F to the wheel rotor 38. This rotation can be in response to, for example, signals from the wheel speed sensors 58 indicating that wheel slip is no longer occurring.

It will be appreciated that rotation of either/both motors 132, 140 can be precisely controlled using pulse width modulation (PWM). For example, the degree and/or rate of braking force F on the pad 37 during braking can be finely tuned as well as the degree and/or rate of braking force reduction during an ABS event. The control system 44 can rely on signals from any of the sensors indicating, for example, road surface conditions, in controlling PWM.

A situation can also arise in which the vehicle must remain in standstill, for example, the vehicle 20 being stationary, e.g., at a stoplight. In this scenario, the control system 44 relies on the vehicle speed sensor 50 and/or wheel speed sensor 58 to determine that the vehicle 20 is stationary, and that the braking force F is sufficient to maintain the vehicle 20 stationary. In response to those signals, the control system 44 rotates the motors 132, 140 in opposite directions and at respective speeds that result in a zero speed of the carrier 210, i.e., the carrier is stationary. Consequently, the piston 102 remains stationary while a constant clamp force F is continuously applied to the brake pad 37 for as long as the vehicle is stationary at the stoplight. Since the motors 132, 140 continue to rotate, while the spindle 122 remains stationary, the overall efficiency of the system 10 is increased because a rotating motor operates at a higher efficiency than a stationary but powered motor, i.e., the motor is stationary but applying torque.

When it is desirable to thereafter quickly release the braking force F, e.g., drive-away release (DAR) event, the control system 44 rotates both motors 132, 140 in appropriate directions to rotate the carrier 210 in a manner that causes the spindle 122 to rapidly rotate in the direction $R_2$. Consequently, the piston 102 is rapidly retracted from the brake pad 37, thereby removing the braking force F from the brake pad. It will be appreciated that, alternatively, only the first motor 132 could be rotated to retract the piston 102 and remove the braking force F. Once the braking force F is released, if the brake demand suddenly increases, the rotation direction of both motors 132, 140 can be reversed to quickly reapply the braking force F.

Figure 6A:
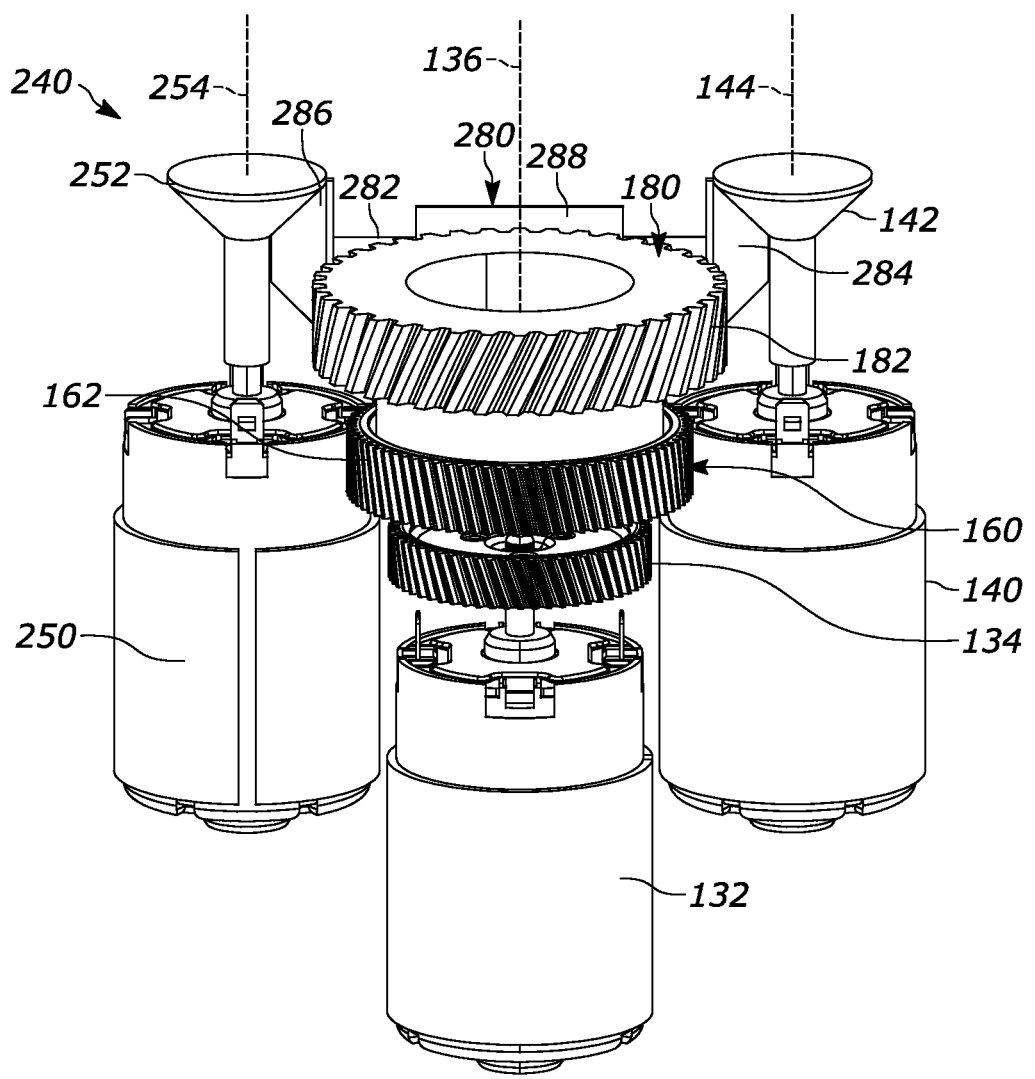
FIG. 6A is a schematic illustration of another example drive assembly for the braking system.
Figure 6B:
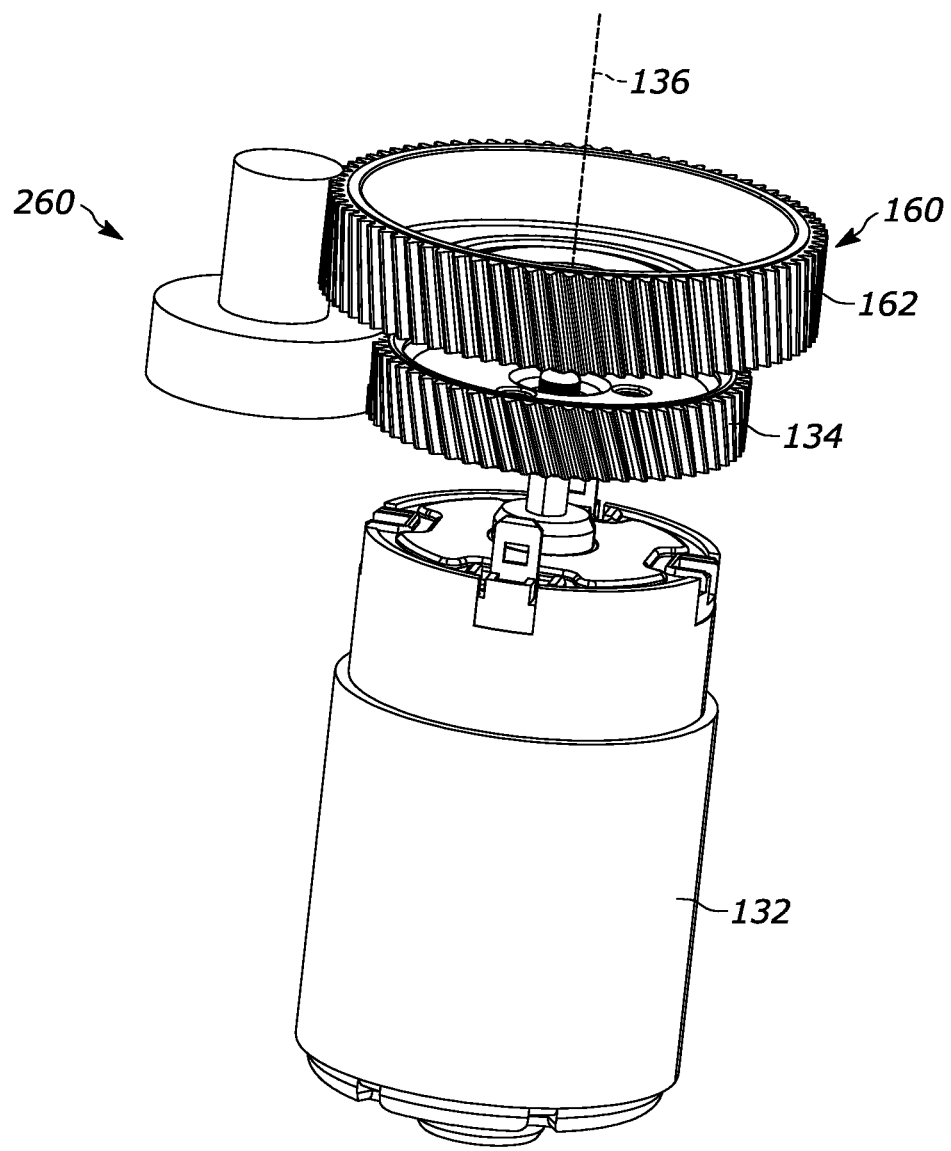
FIG. 6B is a front view of a coupling device for the drive assembly of FIG. 6A.

In another example shown in FIGS. 6A-6B, the caliper assembly 60 is connected to a drive assembly 240 that includes more than two motors. This can be used, for example, in vehicles 20 that need greater braking/clamping force to brake or hold the vehicle stationary, e.g., commercial vehicles such as semis or tractor trailers. Features in FIGS. 6A-6B that are similar to those features in FIGS. 1-4C are given the same reference number. As shown, the drive assembly 240 includes the first motor 132, the second motor 140, and a third motor 250. The third motor 250 includes a gear 252 rotatable about an axis 254 extending parallel to the axes 136, 142 of the motors 132, 140. The third motor 250 can be a brushed DC motor. A gear train couples the second and third motors 140, 250 to the spindle 122.

In this configuration, a coupling device 260 is connected to the first motor 132 and the two stage gear 160 for transferring torque from the first motor to the sun gear 166. Referring to FIG. 6B, the coupling device 260 is a two stage gear meshed with both the gear 134 on the motor 132 and the exterior teeth 162 of the two stage gear 160. That said, a torque flow path exists from the first motor 132, through the gear 134, through the two stage gear 260, and to the sun gear 166 of the two stage gear 160.

Another coupling device 280 is connected to the second and third motors 140, 250 and the ring gear 180 to enable the second and third motors to supply a collective third torque $T_3$ to the ring gear. Referring to FIG. 6A, the coupling device 280 includes a longitudinally extending shaft 282. Gears 284, 286 are provided at respective ends of the shaft 282 and are fixed to/rotatable with the shaft. The gears 284, 286 can be, for example, bevel gears. In any case, the gear 284 meshes with the gear 144 on the second motor 140. The gear 286 meshes with the gear 252 on the third motor 250.

A worm 288 is fixed to and rotatable with the shaft 282 at a position between the gears 284, 286. The worm 288 meshes with the ring gear 180 via worm gear exterior teeth 182 and forms a self-locking connection with the ring gear to prevent back drive of both motors 140, 250 when the control system 44 actuates the parking brake. A solenoid brake (not shown) can be connected to the first motor 132 to prevent back drive thereof.

That said, a torque flow path exists from the second motor 140, through the gear 142, through the gear 284, through the shaft 282, through the worm gear 288, and to the ring gear 180. At the same time, a torque flow path exists from the third motor 250, through the gear 252, through the gear 286, through the shaft 282, through the worm gear 288, and to the ring gear 180.

During operation, the control system 44 cooperates with the drive assembly 240 in a similar manner as the drive assembly 130. In particular, during lower/slower apply rate service brake demands, only the first motor 132 is rotated to supply torque to the sun gear 166 while the second and third motors 140, 250 are deactivated. The ring gear 180 is therefore stationary. Consequently, the spindle 122 is rotated in the direction $R_1$ at a relatively lower apply rate than if both/all motors 132, 140, 250 were applied, and the service brake force F is applied to the rotor 38.

During higher/faster apply rate service brake demands, all three motors 132, 140, 250 are rotated such that the first motor supplies torque to the sun gear 166. The second and third motors cooperate through the coupling device 280 to supply torque to the ring gear 180. It will be appreciated that due to the connection between the motors 140, 250 and the coupling device 280 the rotation directions of the second and third motors will be opposite from one another. The sun gear 166, ring gear 180, and planetary gears 190, 192, 194 combine the torque produced by rotation of the first, second, and third motors 132, 140, 250 such that the carrier 210 is rotated at a greater speed compared to when only the first motor is rotated in the brake apply direction. This, in turn, rotates the spindle 122 at a greater speed in the brake apply direction $R_1$ and causes the piston 102 to move in the direction D more rapidly. As a consequence, the service brake force F is achieved faster than if the motors 140, 250 were deactivated.

In other words, rotating all three motors 132, 140, 250 in the brake apply direction causes the piston 102 to more rapidly advance to the brake pad 37 and, thus, the brake force F is applied to the brake pad more rapidly compared to the speed at which the braking force is supplied by operation of only the first motor 132.

During an emergency event, the control system 44 rotates all the motors 132, 140, 250 up to a brake force F when imminent wheel sleep is predicted. Thereafter, the control system 44 continues to rotate the first motor 132 in the brake apply direction. At the same time, rotation of the second and third motors 140, 250 is reversed and the control system 44 varies the speed of both motors 140, 250 such that the rotation speed thereof rapidly fluctuates between a relatively low value and a relatively high value. It is noted that as the motors 140, 250 are connected to each other via the gear train described above, both motors can be synchronously/independently controlled by the control system 44.

When the second and third motors 140, 250 are operated at the relatively lower speed, the first motor 132 dominates the rotation speed and direction of the carrier 210 and, thus, the spindle 122 will continue rotating in the direction $R_1$—causing the piston 102 to advance. When the second and third motors 140, 250 are operated at the relatively higher speed compared to the first motor 132, the second and third motors dominate the rotation speed and direction of the carrier 210 and, thus, the spindle 122 will rotate in the opposite direction $R_2$—causing the piston 102 to retreat. It is therefore clear that the difference in rotation speed between the first motor 132 and the second/third motors 140, 250 controls the rotation speed and direction of the carrier 210.

Stated differently, the spindle 122 rotates in the direction $R_1$ when the motors 132, 140, 250 are rotated under certain (or first) relative speed configurations and rotates in the direction $R_2$ when the motors are rotated under different (or second) relative speed configurations. As the difference in relative rotation speeds increases, the rotation speed of the spindle 122 will likewise increase. That said, it will be appreciated that the rotation speed of the first motor 132 can alternatively or additionally be adjusted while rotating in the brake apply direction to vary the relative rotation speeds between the motors 132, 140, 250 in a manner that causes the piston 102 to advance/retract.

Once the emergency event is over, the control system 44 can rotate either the first motor 132 or all three motors 132, 140, 250 in the same brake apply direction to re-advance the piston in the direction D in order to reapply the braking force F to the wheel rotor 38. This rotation can be in response to, for example, signals from the wheel speed sensors 58 indicating that wheel slip is no longer occurring.

When it is desirable to hold the vehicle 20 stationary, the control system 44 rotates the motors 132, 140, 250 in respective directions and at respective speeds that result in a zero rotation speed of the carrier 210. Consequently, the piston 102 remains stationary while a constant clamp force F is continuously applied to the brake pad 37 for as long as the vehicle is stationary at the stoplight. Since the motors 132, 140, 250 continue to rotate, while the spindle 122 remains stationary, the overall efficiency of the system 10 is higher than if all three motors 132, 140, 250 were stationary but powered to maintain clamp force.

When it is desirable to thereafter release the braking force F, e.g., DAR release event, the control system 44 reverses rotation of all three motors 132, 140, 250 to rotate the carrier 210 in a manner that causes the spindle 122 to rapidly rotate in the direction $R_2$. Consequently, the piston 102 is rapidly retracted from the brake pad 37, thereby removing the braking force F from the brake pad. Once the braking force F is released, if the brake demand suddenly increases, the rotation direction of all three motors 132, 140, 250 can be reversed to quickly reapply the braking force F.

The drive assembly 240 is particularly advantageous in larger vehicles, such as commercial trucks, that require a greater braking force for both service braking as well as emergency brake situations, e.g., ABS and ESC, or DAR.

With this in mind, the control system 44 can operate the motors 132, 140, 250 individually/synchronously in a manner that provides the different outcomes at the spindle 122, e.g., rotation in either direction $R_1$ or $R_2$ and/or no rotation while all the motors rotate. To this end, the motors 140, 250 can be electrically connected to the control system 44 such that the pair of motors 140, 250 appears to be one motor as far as the control system is concerned. Consequently, the three motor 132, 140, 250 configuration provides the same advantages as the two motor 132, 140 configuration while also providing a more robust braking force F required by larger vehicles.

The electric braking system of the present invention is advantageous in that a variable speed ratio can be achieved by controlling the speed and/or direction of rotation of multiple motors capable of delivering torque to the same spindle. To this end, the control system can operate the motor(s) in a manner that provides high spindle rotation, zero speed spindle rotation and/or directional rotational change for the spindle depending on the braking demand.

When an emergency or DAR event is detected, the control system can advantageously advance and retract the piston by maintaining the brake apply rotation direction of one motor and reversing rotation of any additional motors. The rotation speeds of the reversed motors are alternated between low and high values. This can more rapidly release and re-apply the braking force to the rotor compared to braking systems in which the rotation direction of all the motors utilized must be reversed.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for controlling an electric brake for a wheel rotor having a brake pad associated therewith, comprising:
    a housing defining a passage;
    an assembly in the passage that includes a spindle rotatable about an axis and a piston aligned with the brake pad and axially movable in response to rotation of the spindle;
    a planetary gear stage including a sun gear, a ring gear, and planetary gears;
    a first independently controlled motor coupled to the sun gear;
    a second independently controlled motor coupled to the ring gear; and
    a control system configured to, in response to a detected braking event, rotate the first motor in a first direction to supply torque to the sun gear while the second motor is rotated in a second direction to supply torque to the ring gear, wherein the rotation speed of at least one of the first and second motors is varied such that the piston is cyclically moved towards and away from the brake pad to modulate a braking force on the rotor.

2. The system of claim 1, wherein the spindle rotates in a first manner when the first and second motors rotate at a first relative speed configuration and rotates in a second manner when the first and second motors rotate at a second relative speed configuration.

3. The system of claim 2, wherein rotating the first and second motors at the first relative speed configuration advances the piston and rotating the first and second motors at the second relative speed configuration retracts the piston.

4. The system of claim 1, further comprising a worm gear having a self-locking connection with the ring gear.

5. The system of claim 1, wherein the planetary gear stage includes a carrier fixed to the spindle and rotatable in response to orbiting of the planetary gears about the sun gear and about the ring gear.

6. The system of claim 1, wherein the assembly further comprises a mechanical assembly for transforming rotation of the spindle to axial movement of the piston.

7. The system of claim 1, wherein the first and second motors are brushed DC motors.

8. The system of claim 1, wherein the first motor and second motors are brushless DC motors.

9. The system of claim 1, further comprising a third motor that cooperates with the second motor to supply torque to the ring gear.

10. The system of claim 9, further comprising a coupling device for transferring torque from the second and third motors to the ring gear.

11. The system of claim 10, wherein the coupling device comprises:
    a shaft;
    gears provided at the ends of the shaft and coupled to the second and third motors; and
    a worm provided on the shaft between the gears and coupled to a worm gear of the ring gear so as to have a self-locking connection with one another.

12. The system of claim 9, wherein the first motor is a brushless DC motor and the second and third motors are brushed DC motors.

13. The system of claim 9, wherein the control system is configured to rotate the third motor at the same time and at the same absolute speed as the second motor to supply torque to the ring gear such that the piston is cyclically moved towards and away from the brake pad.

14. The system of claim 1, wherein the detected braking event comprises one of an anti-lock braking or electronic stability control braking situation.

15. The system of claim 1, wherein the control system is configured to, in response to the detected braking event, rotate the first and second motors simultaneously with the first direction and the second direction being opposite directions relative to respective rotation axes of the first and second motors.

16. A method for controlling an electric brake for a wheel rotor having a brake pad associated therewith, comprising:
    providing a housing defining a passage;
    positioning an assembly in the passage that includes a spindle rotatable about an axis and a piston aligned with the brake pad and axially movable in response to rotation of the spindle;
    providing first and second independently controlled motors;
    providing a planetary gear stage including a sun gear coupled to the first motor, a ring gear coupled to the second motor, and planetary gears; and
    rotating the first motor in a first direction to supply torque to the sun gear while rotating the second motor in a second direction to supply torque to the ring gear, wherein the rotation speed of at least one of the first and second motors is varied such that the piston is cyclically moved towards and away from the brake pad to modulate a braking force on the rotor.

17. The method of claim 16, wherein rotating the first and second motors rotate at a first relative speed configuration advances the piston and rotating the first and second motors at a second relative speed configuration retracts the piston.

18. The method of claim 16, further comprising rotating a third motor at the same time and at the same speed as the second motor such that the second and third motors collectively supply torque to the ring gear to cyclically move the piston towards and away from the brake pad.

19. The method of claim 16, wherein the first and second motors are rotated in response to a detected emergency event.

20. The method of claim 16, wherein the first and second motors are simultaneously rotated in opposite directions while the rotation speed of at least one of the first and second motors is varied such that the piston is cyclically moved towards and away from the brake pad to modulate a braking force on the rotor.

\* \* \* \* \*